Figures 1, 2:
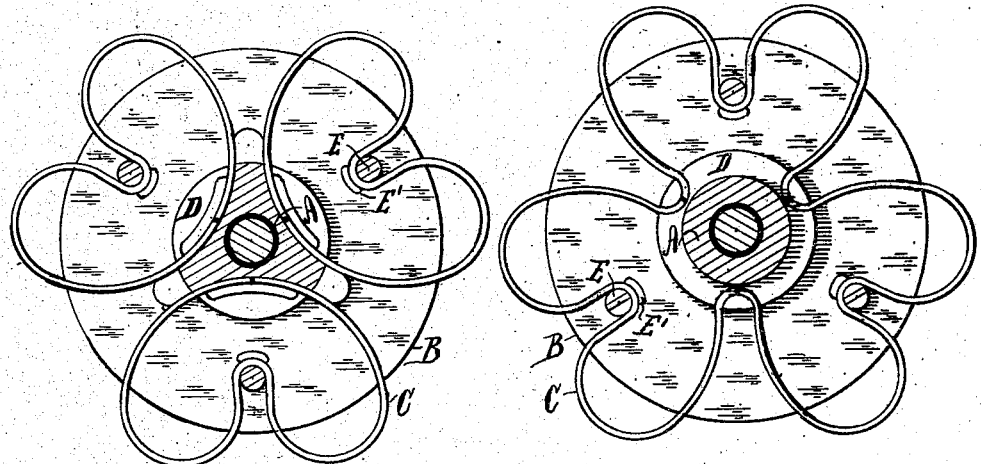

(No Model.) 2 Sheets—Sheet 1.

G. HAYES.
WHEEL FOR BICYCLES.

No. 604,883. Patented May 31, 1898.

Witnesses:
Arthur Hayes.
Harry O. Black.

Inventor:
Geo. Hayes.

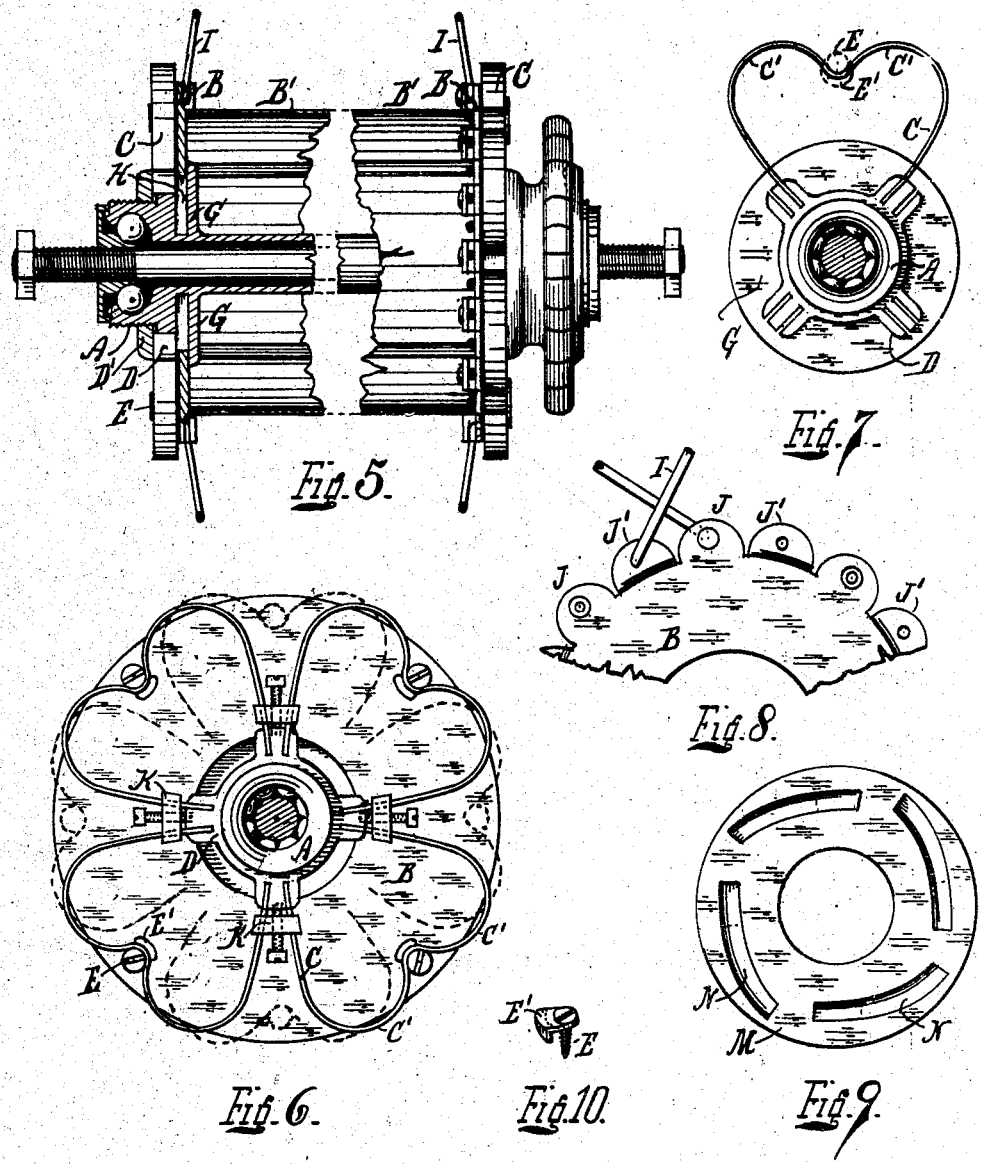

UNITED STATES PATENT OFFICE.

GEORGE HAYES, OF NEW YORK, N. Y.

WHEEL FOR BICYCLES.

SPECIFICATION forming part of Letters Patent No. 604,883, dated May 31, 1898.

Application filed May 21, 1897. Serial No. 637,494. (No model.)

*To all whom it may concern:*

Be it known that I, GEORGE HAYES, a citizen of the United States, and a resident of the city, county, and State of New York, have invented a new and useful Improvement in Wheels for Bicycles and other Vehicles, of which the following is a specification.

My improvement relates to a construction of the wheel-center; and it consists in suspending the axle-hub within a hollow encircling spoke-nave (to which alone the spokes are connected) by sets of metal suspensory springs of certain definite shape and attachment, the object being to secure resiliency wholly within the wheel, and thereby dispense with the pneumatic tires heretofore in use; and the invention consists of the devices and combinations of devices as hereinafter more fully described, and pointed out in the claims, reference being had to the accompanying drawings, in which—

Figures 1, 2, 3, and 4 are elevations showing the axle-hub in cross-section just back of the ball-bearings, face of springs, and end of spoke-nave, illustrating several possible modifications in shaping the springs and manner of securing them upon the axle-hub. Fig. 5 is a lengthwise view of the axle-hub and spoke-nave transversely to the plane of the wheel, one-half in section illustrating position of springs attached by securing-ring to the axle-hub, with nut outside. Fig. 6 is a face elevation of the wheel-center, showing end of axle-hub, springs with their securing-ring, and end of spoke-nave, the dotted lines showing how an extra set of springs may be set at each end of hub adjacent to the main set, showing also attachment of springs to spoke-nave and sliding device for regulating amount of resiliency. Fig. 7 is a face elevation of one spring with securing-ring. Fig. 8 is a face elevation of a portion of one end cheek of the spoke-nave, illustrating a formation of its edge adapted for securing spokes thereto. Fig. 9 is a face elevation of a plate to set upon the axle-hub outside of and against the springs to serve in conjunction with devices in Fig. 6 for regulating amount of resiliency to suit the weight carried. Fig. 10 is a perspective of a clamping device to secure the springs to the spoke-nave.

On the drawings, A indicates the axle-hub, the axle being inclosed thereby with ball-bearings, as usual, or this hub may be constructed otherwise in any suitable manner desired.

B indicates the spoke-nave encircling the axle-hub and receiving the interior ends of the rigid spokes of the wheel.

C indicates the metal springs forming the sole connection between axle-hub and spoke-nave and attached to both, by means of which resiliency in the wheel is secured. Preferably the springs are formed of flat metal, but may be of any form in cross-section, and any number may be used, according to size of hub and strength or stiffness requisite.

Figures 3, 4:
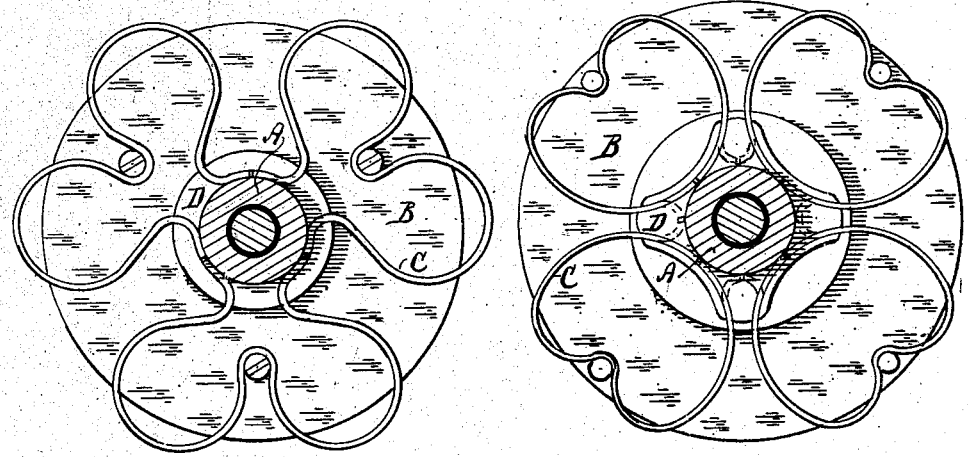

Each spring is so formed that outwardly two semicircles appear, as at C, the web of one piece between them bending reversely, as at C', the web continuing onwardly at each side toward the axle-hub, forming arcs, so that each half of the spring constitutes approximately one-quarter of an ellipse. Nearing the axle-hub the two ends approach each other, as in Fig. 1, where they terminate against each other, or, as in Figs. 2 and 3, where they take a reverse bend and terminate against the inner corresponding end of the next spring. In Fig. 4 the full lines show the end of each spring abutting each other, and the dotted lines show how they may be curved to abut each side against the end of the spring next adjacent. In Figs. 6 and 7 the ends of the springs are shown as fitting into a block or ring D, threaded or sleeved upon the end of the axle-hub. This is the preferable arrangement, as it enables the set of springs to be assembled anywhere to the ring D and then placed upon the hub. This affords also a facility for their sale, so prepared ready for application to the wheel at any time, as when repairs are needed. An outside nut threaded upon the axle-hub effectually secures them, as at D', Fig. 5. Although each spring enters the same securing-ring and is secured thereby upon the axle-hub, yet each is an individual spring and does not cross or touch the next adjacent ones in the circle. When placed in the securing-ring D, no screws or rivets are required to hold them, their own spring-power being sufficient, and when secured to the spoke-nave they must remain in position. The springs are secured to the spoke-nave by a screw, as at E. Lugs projecting from the cheek of the spoke-nave, as at E', or it may be caps fitting over and connected with the screw, as in Figs. 7 and 10, causes each spring to keep to the screw E always.

The spoke-nave is formed with two cheeks B, with between them a drum, plain, corrugated, or ribbed, as at B', and the axle-hub is provided with a flange at each side within the ball-bearing enlargements, as at G, Fig. 5, outside of which the cheeks B of the spoke-nave play. Between the flanges G and the ball-bearing enlargements each side of the wheel a groove is formed in the axle-hub, as at H, Fig. 6, to allow for excess of action in the spoke-nave. The springs set against the outside faces of the cheeks B of the spoke-nave, the surface of which must be flush and smooth, and as it is advisable to keep the diameter of the spoke-nave as small as possible the springs are allowed to project beyond, as illustrated in the several figures. Therefore to facilitate the fastening of the spokes I of the wheel to the cheeks of the spoke-nave I preferably form its outer edge after the manner shown in Fig. 8, where the projecting semicircular points J are pressed out of plane to enable the spokes attached thereto to fit outside thereof toward the springs without projecting beyond the plane of the cheek B. As only the head of the spokes comes through where secured to the alternating semicircular points J, by countersinking them in the metal the surface will remain smooth.

In Fig. 6 at K are shown devices which, fitting over two adjacent springs and each adjusted by a screw, serve as means for regulating the amount of resiliency to suit the weight carried. As the slides K are moved outward or inward by the screws they produce greater or less rigidity and so affect their action, thus enabling the wheel to carry heavier or lighter weight at will with the required amount of resiliency for each.

In Fig. 9 is shown a plate M, having cam-shaped grooves N therein, which, threaded or sleeved upon the axle-hub outside the springs with the grooves fitted to the sliding clamps K, when turned will effectuate the movement of all the sliding clamps simultaneously, and when the nut D' is screwed on tight against the outside face will hold the plate M rigid. One of these plates at each end of the hub A renders the adjustment of resiliency easy and complete.

What I claim as new, and desire to secure by Letters Patent, is—

1. A wheel for bicycles and other vehicles, having a central axle-hub suspended within the hollow of an encircling spoke-nave by series of binary arc suspensory springs of flat metal, arranged around the axle-hub, standing outwardly therefrom parallel to the plane of the wheel and transversely to the hub, the ends of each spring secured to the axle-hub by ring-plates placed thereupon, and each spring formed with a deep depression between its two arcs, the web passing through a clamping device upon a cross-rod forming part of the spoke-nave, securing the spring to the spoke-nave, essentially as set forth.

2. In a wheel for bicycles and other vehicles, having an axle-hub suspended within an encircling spoke-nave by binary arc suspensory springs, the regulating device K, arranged and adapted for operation upon the springs, essentially as set forth.

3. In a wheel for bicycles and other vehicles, the combination consisting of first; the axle-hub A, constructed with groove H, and flanges G; second, the spoke-nave B, constructed with two cheek-rings arranged parallel to the plane of the wheel, encircling the axle-hub and connected together; and third; two sets of binary arc suspensory springs secured to the axle-hub by rings, and to the spoke-nave by hanger-blocks, essentially as set forth.

4. In a wheel for bicycles and other vehicles, a ball-bearing axle-hub having interiorly back of the ball-bearings near each end of the hub, an encircling groove adapted for reception of resiliently-sustained cheek-rings of a special spoke-nave, essentially as set forth.

5. In a wheel for bicycles and other vehicles, an axle-hub having a spindle midway between expanded ball-bearing ends, the two additional guard-flanges herein described, for the purpose set forth.

6. In a wheel for bicycles and other vehicles, the spoke-nave B, constructed with cheeks as rings placed parallel to the plane of the wheel, with as a part thereof, a midway drum B, and having semicircular peripheral projections for securing spokes thereto, essentially as set forth.

GEO. HAYES.

Witnesses:
HARRY I. BLACK,
FRANK HALLE.